United States Patent
Florczak

(10) Patent No.: US 6,268,019 B1
(45) Date of Patent: Jul. 31, 2001

(54) PREPARATION OF FLUORINE MODIFIED, LOW HAZE, TITANIUM DIOXIDE FILMS

(75) Inventor: Glenn P. Florczak, East Brunswick, NJ (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/315,193

(22) Filed: May 19, 1999

Related U.S. Application Data

(60) Provisional application No. 60/087,932, filed on Jun. 4, 1998.

(51) Int. Cl.$^7$ ................................................ C23C 16/08
(52) U.S. Cl. .............. 427/166; 427/255.19; 427/255.36; 427/255.391; 65/60.5
(58) Field of Search .............................. 427/166, 255.19, 427/255.36, 255.391; 65/60.5

(56) References Cited

U.S. PATENT DOCUMENTS

| | | |
|---|---|---|
| 3,916,041 | 10/1975 | Chu et al. . |
| 4,351,267 | 9/1982 | Kalbskopf et al. . |
| 4,504,522 | 3/1985 | Kaiser et al. . |
| 4,696,837 * | 9/1987 | Lindner . |
| 5,041,150 | 8/1991 | Grundy et al. . |
| 5,124,180 * | 6/1992 | Proscia . |
| 5,597,515 * | 1/1997 | Kauffman et al. . |

FOREIGN PATENT DOCUMENTS

| | | |
|---|---|---|
| 962428 * | 12/1999 | (EP) . |
| WO 93/22070 | 11/1993 | (WO) . |

OTHER PUBLICATIONS

K. Kamata, et al., "Rapid Formation of TiO$_2$ Films By Conventional CVD Method", *J. Mat. Sci. Let.*, 9 (1990) 316–319 (No month).

S. D. Allen, "Laser CVD–Applications In Materials Processing", *Proc. Soc. Photo–Opt. Instrum, Eng.*, 198 (1980) Abstract (No month).

S. Hayashi, et al., "Chemical Vapor Deposition of Rutile Films", *J. Crystal Growth*, 36(1) (1976) Abstract (No month).

S. Zhang, et al., "Photoconducting TiO$_2$ Prepared By Spray Pyrolysis Using TiO$_2$", *Thin Solid Films*, 213 (1992) 265–270 (No month).

H. Komiyama, et al., "Particle Precipitation Aided CVD For Rapid Growth Of Ceramic Films", *Proc. Electrochem. Soc.*, (1987) 87–88 (Proc. Int. Conf. CVD, 10$^{th}$, 1987), 1119–28 (No month).

(List continued on next page.)

Primary Examiner—Timothy Meeks
(74) Attorney, Agent, or Firm—Nicholas J. DeBenedictis; Stanley A. Marcus

(57) ABSTRACT

The present invention concerns the deposition of fluorine modified, titanium dioxide films (TiO$_2$) onto hot glass by atmospheric pressure chemical vapor deposition (APCVD) using TiCl$_4$ vapor. The invention is also suitable for depositing other metallic oxide films from their metallic halides such as SnCl$_4$, GeCl$_4$, and VCl$_4$. The present invention provides a process that deposits a novel, fluorine modified, titanium dioxide film (TiO$_2$) onto hot glass by atmospheric pressure chemical vapor deposition using TiCl$_4$ vapor. The process uses injection of TiCl$_4$ into a hot, nonoxygen containing carrier gas and blends the carrier gas and TiCl$_4$ vapor with an oxygen containing gas stream containing a haze reducing quantity of a fluorine containing compound before contacting a surface of hot glass with the blended mixture. The process is capable of depositing a fluorine modified, TiO$_2$ film at deposition rates exceeding 900 Å per second. The crystalline phase of the fluorine modified film is essentially anatase. The film has a haze of less then 1% and a refractive index of greater than or equal to about 2.48. Also provided is an apparatus for practicing the process and a novel coated glass.

13 Claims, 2 Drawing Sheets

OTHER PUBLICATIONS

N. Tanaka, et al., "Preferential Orientation Of Titanium Dioxide Polycrystalline Films Using An Atmospheric CVD Technique", *J. Ceram. Soc. Jpn.*, 105 (Jul.) (1997) Abstract.

K. Kamata, et al., "Synthesis Of Titanium Dioxide Film By Laser CVD", *NipponSeramikkusu Kyokai Gakujutsu Ronbunshi*, 97(12) (1998) Abstract (No month).

* cited by examiner

Table 1

Dependance of Film Haze on TFA Concentration

| % TFA (mol %) | % Haze | (s.d.) |
|---|---|---|
| 0.00 | 3.38 | 1.4 |
| 0.05 | 0.60 | 0.3 |
| 0.10 | 0.45 | 0.1 |
| 0.25 | 0.37 | 0.1 |

Table 2

Dependance of Film Haze on Additive

| Additive | Amount | % Haze |
|---|---|---|
| None | - | 3.38 |
| TFA | 0.25 | 0.37 |
| ETFA | 0.25 | 2.30 |
| TFE | 0.25 | 2.70 |

TFA= trifluoroacetic acid
ETFA= ethyl trifluoroacetate
TFE= trifluoroethanol

PREPARATION OF FLUORINE MODIFIED, LOW HAZE, TITANIUM DIOXIDE FILMS

This application claims the benefit of Provisional Application Serial No. 60/087,932 which was filed Jun. 4, 1998.

BACKGROUND OF THE INVENTION

1. Field of the Invention

The present invention concerns the deposition of fluorine modified, titanium dioxide films ($TiO_2$) onto hot glass by atmospheric pressure chemical vapor deposition (APCVD) using $TiCl_4$ vapor. The invention is also suitable for depositing other metallic oxide films from their metallic halides such as $SnCl_4$, $GeCl_4$, and $VCl_4$.

2. Technical Advance

Beneficial metallic oxide coatings for glass are known for improving one or more properties of the glass. Commercial glass coaters desire metallic oxide coatings that are free of contaminants or surface irregularities that diminish the optical properties of the glass. To be economical, the coatings must be deposited at rates that are commensurate with the operating speeds of a commercial float glass line. An economical process also requires that the chemical components be readily available and inexpensive. Materials that fulfill these needs are often metal chlorides. However, when metal chlorides are deposited at fast rates the resultant films often have rough surfaces which scatter the impinging light, causing haze. This haze reduces optical transmission and gives the article an aesthetically unpleasing look. This invention is a Atmospheric Pressure Chemical Vapor Deposition (APCVD) method for depositing films of metal oxides at very fast rates which have a low degree of haze using readily available, inexpensive, metal halide precursors.

Prior art processes generally have utilized Solution Spray, Low Pressure CVD, or Atmospheric Pressure CVD (APCVD). Solution sprays often require solvents and produce poor quality films while low pressure CVD techniques are batch operations and produce films at low deposition rates. Films that have been deposited by APCVD techniques are often hazy and frequently require thermal post-treatments to obtain the desired properties, and more expensive starting materials are often used. In contrast, the method of the present invention allows one to use inexpensive metal halides in a continuous APCVD process to produce oxide films at rates $\geq 900$ Å/sec. These films have haze values of <1% and are uniform and continuous with reduced surface roughness.

The method of the present invention enables glass coaters to deposit high quality $TiO_2$ films on the float line at the high line speeds practiced with commercial float lines without any major disruption to the existing coating set-up.

DESCRIPTION OF THE PRIOR ART

In the publication "Rapid Formation of $TiO_2$ Films by a Conventional CVD Method" by K. Kamata, et. al., *J. Mat. Sci. Let.*, 9 (1990) 316–319, the authors teach the use of Ti (O-i-Pr)$_4$ in an APCVD process to deposit $TiO_2$ films. The method uses vapor transport through a concentric tube nozzle with the substrate above the nozzle. This configuration minimizes contamination on the growing film by particulate $TiO_2$ that may form in the vapor prior to film deposition. The $TiO_2$ precursor is vaporized by bubbling a carrier gas through a heated reservoir of precursor liquid. In contrast, the present invention uses a different $TiO_2$ precursor and vaporizes it by direct injection into a hot carrier gas along with a novel combination of reagents that modify and improve the resulting $TiO_2$ film morphology and increase deposition rate of the film onto hot glass. The following table compares the chemistry and process conditions of the present invention with the chemistry and process as taught in Kamata:

Coating Comparisons

|  | Kamata | Present Invention |
| --- | --- | --- |
| Precursor | Ti(O-i-Pr)$_4$ | TiCl$_4$ |
| Glass temperature | 300–500 °C. | 550–675 °C. |
| Precursor concentration | 0.22–3.6% | 0.25–2.0% |
| Nozzle distance to glass | 5–25 mm | 25 mm |
| Vaporization temp. | 80–130 °C. | 140–180 °C. |
| Carrier-N$_2$/O$_2$ | 2/1–1/2 | 2/1–1/2 |
| Carrier flow | 1.5–3.5 m/s | 1.9–3.1 m/s |
| H$_2$O concentration | 0–21% | 0.25–6% |
| Deposition rate | 800–1000 Å/s | 900–1200 Å/s |

Under certain conditions, Kamata obtains smooth, crystalline, anatase $TiO_2$ films at rates of ~1000 Å/sec, contrary to others who get rough films at high deposition rates. However, Kamata's maximum deposition rate occurs at ~500° C. and at these high temperatures, the process often produces significant amounts of powder in the vapor phase and films have a rough surface. Using Kamata's precursor and deposition conditions at temperatures typically encountered in a glass float bath, ~575–600° C., the high deposition rates were not achieved. In contrast, at the higher temperatures encountered in a float bath, the rates obtained using the present invention are faster. This represent a significant commercial advantage over the Kamata process. Although Kamata makes no specific mention of film haze, we have found that the films deposited with the isopropoxide in accordance with the teaching of Kamata and under the same conditions as the fluorine modified $TiCl_4$ process of the present invention had haze values $\geq 1\%$ as opposed to films of the present invention, which consistently measure <1% haze. Accordingly, the present invention produces fluorine modified $TiO_2$ film having less haze at faster rates and at higher substrate temperatures then Kamata, thereby making the present process and product more suitable for production on a commercial float line.

"Laser CVD-applications in materials processing", *Proc. Soc. Photo-Opt. Instrum. Eng.*, 198 (1980) 49–56. CAN 92:204194, S. D. Allen describes the deposition of $TiO_2$ films at rates of ~333 Å/sec by use of a focused $CO_2$ laser beam to locally heat the substrate and a mixture of $TiCl_4$, $H_2$, and $CO_2$ gases. The method does not produce a fluorine modified $TiO_2$ film, is not practical on a large scale, and operates at a significantly slower rate.

S. Hayashi and T. Hirai, in "Chemical vapor deposition of rutile films", *J. Crystal Growth*, 36(1), 157–64 (1976). CAN 6:63641 describe the deposition of rutile titania films on metallic substrates between 400–900° C. from a $TiCl_4$-$H_2O$ system using argon as a carrier gas. The carrier was bubbled through the reagents and the saturated vapors were transported to the heated substrate. Maximum deposition rates of ~70 Å/sec were obtained at 900° C. The method does not produce a fluorine modified $TiO_2$ and although high temperatures are used, film deposition rates are low, and the bubbler feed method is not efficient.

In "Photoconducting $TiO_2$ prepared by spray pyrolysis using $TiO_2$" by S. Zhang, et. Al., *Thin Solid Films*. 213, 265–270 (1992), nitrogen is bubbled through a reservoir of $TiCl_4$ at room temperature and the saturated vapors are directed to a heated chamber where the substrate is mounted in the inverted position about 15 cm above the nozzle. Water is excluded from the system by design. Above a substrate temperature of 362° C., hazy films composed of both rutile and anatase phases are deposited at a deposition rate of <2 Å/sec. Below 322° C., clear anatase films were obtained. This process produces hazy films at very slow rates by an inefficient method.

In "Method of depositing titanium dioxide films by chemical vapor deposition", U.S. Pat. No. 3,916,041, Oct. 28, 1975, T.Chu, et. al. describes the preparation of titania films on various substrates in a tube reactor. A gaseous mixture of an inert carrier gas, $TiCl_4$, $H_2$ in molar excess, and $O_2$ are passed over the substrate heated to a temperature between 227–927° C. At a preferred temperature of 600° C., oxygen deficient, rutile phase titania films are deposited at rates of ~1 Å/sec. The $TiCl_4$ vapors are generated by bubbling a carrier gas through a liquid reservoir. The method does not produce a fluorine modified $TiO_2$ film, has low film deposition rates, uses an inefficient bubbler system, and a tube reactor not practical for large scale work.

There are a number of other references which mention rapid deposition rates, but the precursor used in all cases was $Ti(O-i-Pr)_4$ and haze is not discussed. For example:

In "Particle precipitation aided CVD for rapid growth of ceramic films" by H. Komiyama, et. al., *Proc. Electrochem. Soc.* (1987), 87–8(Proc. Int. Conf. CVD, 10th, 1987), 1119–28, $TiO_2$ particles, deliberately formed in the gas phase, condense on substrate at lower temperature than vapor. Rates as high as 1000 Å/sec claimed.

"Preferential orientation of titanium dioxide polycrystalline films using an atmospheric CVD technique" by N. Tanaka, et. al., *J. Ceram. Soc. Jpn.*, 105(July), 551–554 (1997). CAN 127:179839, crystalline $TiO_2$ films deposited from alkoxide precursor at maximum rate of 450 Å/sec. Rate depended on vaporizing and substrate temperatures (not mentioned).

In "Synthesis of titanium dioxide film by laser CVD" by K. Kamata, et. al., *NipponSeramikkusu Kyokai Gakulutsu Ronbunshi*(1998), 97(12), 1534–6. CAN 112:82730, anatase films of $TiO_2$ were deposited at 400° C. by laser assisted CVD of the isopropoxide at a rate of ~400 Å/sec.

"Method for making a titanium dioxide oxygen sensor element by CVD" by W. Kaiser and E. Logothetis, U.S. Pat. No. 4,504,522, Mar. 12, 1985, anatase films of $TiO_2$ are deposited on a substrate at 400–700° C. in a LPCVD chamber where a low pressure mixture of a carrier gas, $O_2$, and the isopropoxide vapors are passed over the substrate for a period of time. Deposition rates as high as ~833 Å/sec were obtained. Water vapor was deliberately excluded from the reaction chamber.

SUMMARY OF THE INVENTION

The present invention provides a process that deposits a novel, fluorine modified, metallic oxide film such as titanium dioxide ($TiO_2$) onto hot glass by atmospheric pressure chemical vapor deposition using $TiCl_4$ vapor. The process uses injection of $TiCl_4$ into a hot, nonoxygen containing carrier gas and blends the carrier gas and $TiCl_4$ vapor with an oxygen containing gas stream containing a haze reducing quantity of a fluorine containing compound before contacting a surface of hot glass with the blended mixture. The process is capable of depositing a fluorine modified, $TiO_2$ film at deposition rates exceeding 900 Å per second. The crystalline phase of the fluorine modified film is essentially anatase. The film has a haze of less then 1%. A refractive index of greater than or equal to about 2.48 is achievable. Also provided is an apparatus for practicing the process.

DETAILED DESCRIPTION OF THE INVENTION

Figure 1:
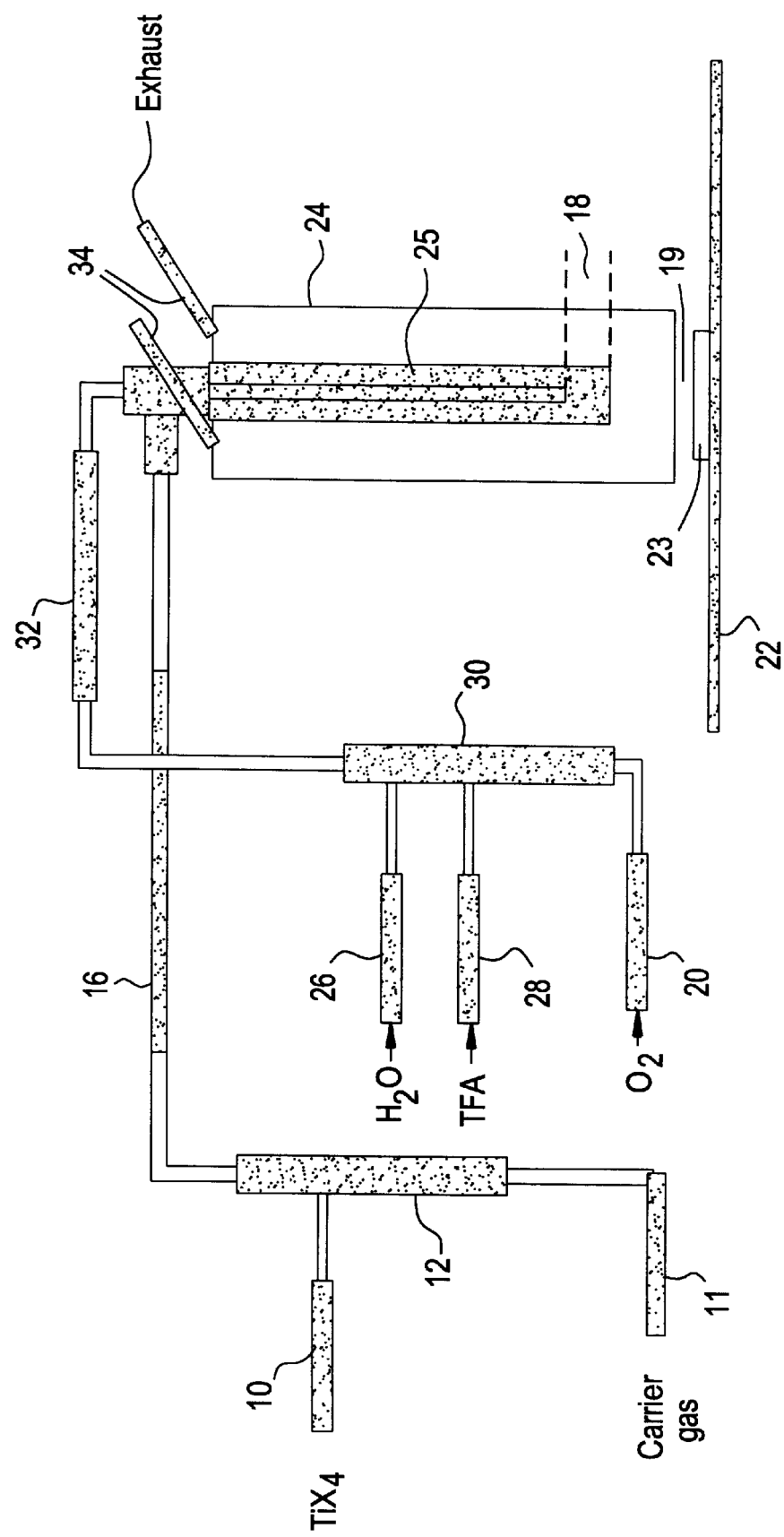
FIG. 1 is a schematic representation of the process and the apparatus for practicing the process. It will be understood by those skilled in the art that the schematic presented for the process is only one of many that could be used as long as the essential feature is preserved, namely keeping the reactive components separate ($TiX_4$ and a source of oxygen) until they enter a blending zone just before contacting the glass surface.

As shown in FIG. 1, preferably, a carrier gas is preheated in preheater 11 and $TiCl_4$ is injected into heated vaporizer 12 which elevates and maintains the temperature of the carrier gas/$TiCl_4$ vapor mixture above 100° C. as it enters conduit 16. Preferably, exterior electrical resistance elements are used to heat the preheater and the vaporizer, such as electrical heating tapes.

The carrier gas used to transport the $TiCl_4$ at an elevated temperature should be essentially free of oxygen in order to avoid or minimize the formation of $TiO_2$ particles prior to contact with the hot glass surface. Nitrogen, argon and helium are suitable carrier gases. Sources of oxygen to be avoided in the carrier gas include $O_2$, $H_2O$, $N_2O$ and $CO_2$. The preferred temperature of the mixture of carrier gas and $TiCl_4$ vapor is above 100° C. with 140 to 180° C. being preferred.

The reaction gas is shown in FIG. 1 as being conveyed in a separate conduit, 32, from the carrier gas and $TiCl_4$ vapor that is shown in conduit 16. It is essential to avoid mixing of reaction gas with the carrier gas and $TiCl_4$ prior to a short blending zone immediately prior to contacting the hot surface of the glass 22. To accomplish this separation, separate conduits 16 and 32 are used. Essential components of the reaction gas are $O_2$, $H_2O$ and a fluorine containing compound such as monofluoroacetic acid, difluoroacetic acid, trifluoroacetic acid, trifluoroethanol, and ethyltrifluoroacetate. Preferred is trifluoroacetic acid (TFA). The beneficial modifications to the resulting $TiO_2$ film morphology are caused by the fluorine compound.

The function of mixing zone 18 is to provide mixing of the reactants with the metallic precursor immediately before contacting the glass surface and in as short a time as possible in order to avoid the formation of $TiO_2$ particles in the gas phase prior to vapor contact with the hot glass surface. If the mixing zone is too large, then particle formation may become significant. Incorporation of particulates in the film will create surface irregularities which can scatter light causing film haze.

The process and the apparatus for practicing the process can be better understood with reference to the FIG. 1. A carrier gas is preheated to a desired temperature in heater 11. Pump 10 injects $TiCl_4$ into an electrically heated vaporizer 12 where it is vaporized on contact with the carrier gas preferably by thin film evaporation from the vaporizer walls.

The mixture of carrier gas and $TiCl_4$ passes through conduit 16 into coating apparatus 24. A reaction gas containing a source of oxygen is preheated in heater 20 and is directed to vaporizer 30. Water and a fluorine compound are feed by pumps 26 and 28, respectively, to vaporizer 30 and the vaporized mixture in the reaction gas is fed separately into coater 24 through conduit 32 without contact with the mixture of $TiCl_4$ and carrier until both the reaction gas and the mixture enter a blending zone 18. Blending zone 18 is sized to achieve mixing of the film forming ingredients without significant reaction of the components prior to contacting the hot surface of glass 22 in contact zone 19. Undesirable $TiO_2$ particles, that can form in the gas phase prior to contacting the hot glass surface, and which interfere with the smoothness of the film 23 and cause haze or light scattering, are thereby minimized by the size of blending zone 18. The blending zone 18 is defined as the area between (a) the point where blending of the reaction gas and the mixture of carrier gas and $TiCl_4$ first occurs, and (b) the discharge point of the blend into the area above the surface of glass 22 where impingement of the blend against the hot surface of the glass occurs. Typical dimensions for the blending zone are for 18 to begin about 100 millimeters (mm) above the glass surface 22 (when the mixture and the reaction gas enter zone 18, and blending begins) and terminate about 25 mm above the glass surface at the end of conduit 16. Although mixing can continue below the end of conduit 16, the area below conduit 16 is defined herein as contact zone 19. Impingement of the blend and reactions between ingredients in the blend and with the hot glass occurs in contact zone 19, and exhausting of the blend and/or reaction products occurs from contact zone 19. By-products and unreacted vapors are removed from area 19 through exhaust line 34. Preferably, glass 22 moves continuously across contact zone 19 where film 23 is continuously deposited onto the hot surface of glass 22 at a rate of at least 900 Å/second. Likewise reaction gas and the mixture of $TiCl_4$ are fed continuously to contact area 19.

The presence of fluorine in or on the film is difficult to detect analytically but is manifested by reduced haze. The effects of fluorine modification to the $TiO_2$ films are primarily seen in the physical property of film haze. The beneficial property of reduced haze for the fluorine modified $TiO_2$ film has been conclusively attributed to the presence of the fluorine compound in the reaction gas stream. The $TiO_2$ films produced by the preferred embodiments of this invention are crystalline in nature consisting essentially of the anatase phase. Comparative testing of the fluorine modified $TiO_2$ film verses a $TiO_2$ film produced under the same conditions but without the presence of fluorine during film formation has established that the effect of fluorine modification is to control the average grain size for the $TiO_2$ film. In one comparative test, the average grain size (AGS) was about 1000 Å as determined by Atomic Force Microscopy (AFM) and Scanning Electron Microscopy (SEM) for a fluorine modified film with a haze value of <1% as compared to a non-fluorine modified $TiO_2$ film produced under otherwise comparable conditions that had an AGS of about 1500Å and a haze value of >1%.

The preferred embodiment of this invention is an APCVD method for depositing metal oxide films with a low degree of haze on a hot surface of a substrate at commercially acceptable rates. The reactor can be of any design which controls the time of mixing of two or more reactive components before impingement of the vapor stream on the substrate surface. This control is preferably achieved through appropriate sizing of the blending zone 18. A preferred design is a vertical, cold-wall, parallel slot or concentric tube configuration having the blending zone 18 that can vary from 25 to 100 mm in which blending occurs of carrier gas and $TiCl_4$ vapor with reaction gas containing $H_2O$, a source of $O_2$ and a source of fluorine. The most preferred configuration for coater 24 consists of three chambers, an inner-most chamber formed by the continuation of conduit 16 that terminates about 100 mm from the substrate 22, a middle chamber 25 that functions as a continuation of conduit 32, and terminates about 25 mm from the glass surface giving an effective blending zone 18 of 75 mm, and an outer chamber that functions as an exhaust zone and is the area formed between the outer surface of chamber 25 and the outer walls of coater 24 through which the blend of carrier gas, $TiCl_4$, reaction gas and/or reaction products leaves contact zone 19 after forming metallic oxide film 23 on glass 22. Other apparatus and methods can be used for initiating blending other than employing concentric conduits 16 and 32 and terminating one of them further above the glass 22 than the other other conduit. For example both conduits 16 and 32 can terminate into a separate blending chamber directly above the glass surface. The term "blend" as used herein refers to the material resulting from blending whether the resulting material is a mixture of the individual components blended or contains reaction products of components combined by blending. Therefore, "blend" is the product produced by the process of blending.

The carrier gas can be any gas or mixture of gases suitable for vapor transport as long as it is essentially free of a source of oxygen. Preferred carrier gas is nitrogen. The gas component of the reaction gas can also be any gas or mixture of gases suitable for vapor transport and containing some form of oxygen. Preferred reaction gas is oxygen. The proportion of carrier gas and reaction gas entering the blending zone 18 is nitrogen and oxygen in a volume ratio between 2:1 to 1:2 and at a total flow rate of from 12 to 50 liters per minute (1pm) measured at 25° C. and atmospheric pressure (STP). The metallic oxide precursor is preferably vaporized in a nitrogen flow while other additives are vaporized into an oxygen containing atmosphere. The vaporizer temperature, either 12 or 30, can vary and is preferably in the range of from 140 to 180° C. The metallic oxide precursor (e.g. $TiCl_4$) concentration can range from 0.25 to 2.0 mol % in the blend and the terminal velocity of the blend stream entering contact zone 19 can vary from 1.9 to 3.1 meters per second (m/sec) and calculated as if the blend is an ideal gas at STP. Substrate 22 temperatures can range from 500 to 675° C. In order to achieve commercially acceptable deposition rates, water is added from 1–3 mol/ mol of metallic oxide precursor. To obtain films with diminished haze, from 0.10 to 0.50 mol of fluorine containing haze reducing compound is added to the vapor stream per mol of metallic precursor.

The process and the resulting film deposited on hot glass have been discussed in terms of $TiO_2$ produced from a gas stream containing the metallic chloride, $TiCl_4$, however, it is to be understood that in its broadest concept, the present invention includes the use of other metallic halides or a combination of metallic halides in the production of novel, fluorine modified, metal oxide films on hot glass. Other metallic chlorides include $SnX_4$, $GeX_4$, and $VX_4$. In the preferred embodiment, the metal oxide precursor is a metal chloride chosen from the group consisting of $TiCl_4$, $SnCl_4$, $GeCl_4$, and $VCl_4$, the haze reducing compound is a fluorine containing compound and the carrier gas is a $N_2/O_2$ mixture in a volumetric ratio of from 2:1 to 1:2.

In a more preferred embodiment, the metal oxide precursor is $TiCl_4$, the haze reducing compound is an organofluorine compound chosen from the group comprising monofluoroacetic acid, difluoroacetic acid, trifluoroacetic acid, trifluoroethanol, and ethyltrifluoroacetate, and the carrier gas is a $N_2/O_2$ mixture in a volumetric ratio of about 2:1. From 1 to 3 mols of water and from 0.05 to 0.20 mols of TFA can be used per mol of $TiCl_4$.

In the most preferred embodiment, films with haze $\leq 1\%$ and refractive indices $\geq 2.48$ are deposited at rates $\geq 1000$ Å/sec when about 2 moles of water and about 0.10 mol of TFA are used per mol of $TiCl_4$.

EXAMPLE 1

A soda lime silica (SLS) glass plate 25 cm² was heated on a hot block to ~610° C. A gas mixture of 0.76 mol % titanium tetrachloride in 20 lpm nitrogen carrier gas (0.5 mol % on the total gas flow) at a temperature of 160° C. and, in a separate fed tube, a reaction gas mixture of 2.95 mol % water vapor, 0.3 mol % trifluoroacetic acid (TFA) in 10 lpm oxygen, also at 160° C., were fed to a blending zone. The separate gas streams were combined in the blending zone that started about 100 mm above the substrate before impingement on the substrate. The blended gases impinged on the glass plate with a face velocity of 2.1 m/sec for 1.3 seconds. The resultant film was clear, free of particles, had a blue-yellow reflected color, a Refractive Index (R.I.) of 2.49 and a thickness of 1264 Å as measured on a Prism Coupler. The Prism Coupler thickness measurement is about 200 Å lower than actual film thickness based on Profilometer measurements. Based on the corrected thickness, the deposition rate is ~1120 Å/sec. SEM analysis showed the film to be composed of a fine-grained, void-free surface. XRD analysis showed the film to be composed predominantly of the anatase phase of TiO2 with a (101) preferred orientation. The film haze was measured on a Gardner Hazemeter and found to be <1%.

Example A.

The procedure of example 1 was repeated, but without trifluoroacetic acid in the gas mixture. The deposited film was clear, free of particles and had a blue-yellow reflected color. A R.I. of 2.50 and a thickness of 1294 Å was measured on a Prism Coupler. Based on the corrected thickness, the deposition rate is ~1195 Å/sec. SEM analysis showed the film to be composed of coarser grains than the film deposited in Example 1. XRD analysis showed the film to be composed predominantly of the rutile phase of TiO2 with a (110) preferred orientation. The film haze was measured on a Gardner Hazemeter and found to be ~3.1%.

Figures 2, 3, 4:
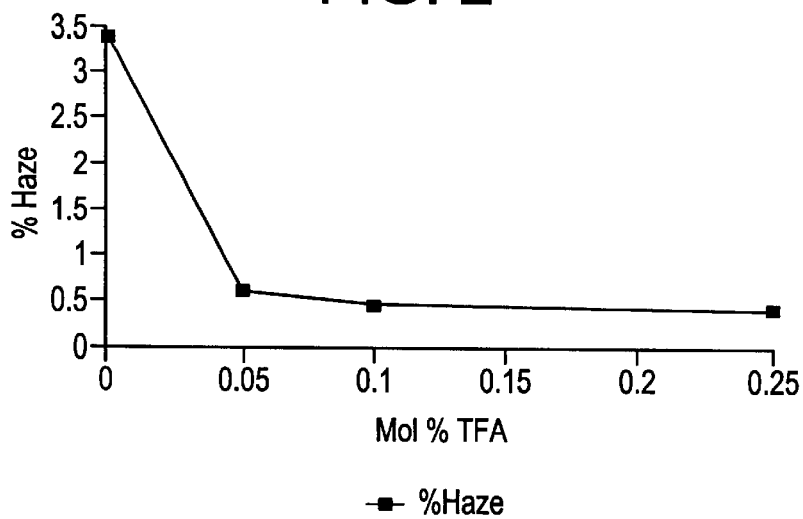
FIG. 2 is a graphical depiction of the effect of fluorine modification on the haze of a $TiO_2$ film deposited onto a hot surface of glass.

Additional Examples:

The procedure of Example 1 was repeated with various levels of TFA and with other sources of fluorine. The results are given in Tables 1 and 2 and shown in FIG. 2 for TFA in terms of haze of the resulting film. As can be seen from FIG. 2, the effect of fluorine is significant in terms of haze reduction.

What is claimed is:

1. A process for depositing onto glass at a glass temperature from 500° C. to 675° C. a fluorine modified $TiO_2$ film crystalline in nature and consisting essentially of the anatase phase comprising injecting $TiCl_4$ into a heated carrier gas that is essentially free of oxygen, blending the heated carrier gas and $TiCl_4$ with a reactive gas stream containing water vapor, a source of oxygen and a haze reducing quantity of a fluorine containing compound, contacting a hot glass surface with the blend to deposit a fluorine modified $TiO_2$ film onto the hot glass surface.

2. The process of claim 1 wherein the carrier gas is heated to a temperature of at least 140° C.

3. The process of claim 1 wherein the carrier gas is nitrogen.

4. The process of claim 1 wherein the concentration of $TiCl_4$ in the blend of carrier gas and reactive gas is from 0.25 mol % to 2.0 mol %.

5. The process of claim 1 wherein the reactive gas stream contains $O_2$ and the fluorine compound is selected form the group consisting of monofluoroacetic acid, difluoroacetic acid, trifluoroacetic acid, trifluoroethanol, and ethyltrifluoroacetate.

6. The process of claim 5 wherein the ratio of carrier gas to reactive gas results in a volumetric ratio of carrier gas to $O_2$ of from 0.5:1 to 2.0:1.

7. The process of claim 5 wherein the concentration of the haze reducing quantity of the fluorine containing compound is from 0.1 to 0.5 mol per mol of $TiCl_4$.

8. The process of claim 7 wherein the haze reducing fluorine containing compound is trifluoroacetic acid.

9. The process of claim 8 wherein the concentration of trifluoroacetic acid is 0.1 mol per mol of $TiCl_4$.

10. The process of claim 8 wherein the concentration of trifluoroacetic acid is 0.1 mol per mol of $TiCl_4$ and the concentration of water vapor is 2 mol per mol of $TiCl_4$.

11. The process of claim 1 wherein the concentration of $H_2O$ vapor in the blend of carrier gas and reactive gas is from 0.25% to 6.0%.

12. The process of claim 1 wherein the temperature of the blend is from 140° C. to 180° C., the temperature of the glass surface is greater then 500° C. and the fluorine modified film is deposited at a rate in excess of 900 Å per second.

13. The process of claim 1 wherein the concentration of the haze reducing quantity of the fluorine containing compound is from 0.1 to 0.5 mol per mol of $TiCl_4$.

* * * * *